United States Patent [19]

Gutleber

[11] 4,434,505

[45] Feb. 28, 1984

[54] INTERFERENCE CANCELLING SYSTEM FOR A MOBILE SUBSCRIBER ACCESS COMMUNICATIONS SYSTEM

[75] Inventor: Frank S. Gutleber, Little Silver, N.J.

[73] Assignee: The United States of America as represented by the Secretary of the Army, Washington, D.C.

[21] Appl. No.: 445,800

[22] Filed: Dec. 1, 1982

[51] Int. Cl.[3] .............................................. H04B 15/00

[52] U.S. Cl. ........................................ 455/50; 455/63; 375/58

[58] Field of Search ................... 455/1, 50, 53, 58, 63, 455/305, 306, 296; 370/119, 30; 328/165, 167; 375/58, 102

[56] References Cited

U.S. PATENT DOCUMENTS 4,301,530 11/1981 Gutleber ............................... 370/18

4,308,614 12/1981 Fisher et al. ........................ 370/119

*Primary Examiner*—Robert L. Griffin

*Assistant Examiner*—Albert W. Watkins

*Attorney, Agent, or Firm*—Robert P. Gibson; Jeremiah G. Murray; Sheldon Kanars

[57] ABSTRACT

Undesired intentional interference, i.e. jamming signals in a multiple accessing mobile subscriber system employing a plurality of subscriber communication terminals, selectively transmitting and receiving desired signals from one another via a central node or repeater station, is achieved by intercepting relatively strong jamming signals, also directly received by the various subscriber communication terminals, and transmitting the jamming signals to the central node where they are then retransmitted or relayed to the subscriber terminals in a dedicated orthogonal multiplexed channel relative to respective signal channels carrying desired communications signals. Each terminal includes means for demultiplexing the orthogonal channel and the signal channel. The relayed jamming signals are adjusted in amplitude and time position so that they are equal to and coincident in time with the directly received jamming signals. The two jamming signals are then fed to signal differencing means which operates to cancel the jamming signals while providing an interference free output of the desired signal

14 Claims, 2 Drawing Figures

INTERFERENCE CANCELLING SYSTEM FOR A MOBILE SUBSCRIBER ACCESS COMMUNICATIONS SYSTEM

The invention described herein may be manufactured and used and licensed by or for the Government for governmental purposes without the payment to me of any royalties thereon.

FIELD OF THE INVENTION

This invention relates to multiple accessing mobile subscriber access communications systems and more particularly to a method and apparatus for eliminating intentional interference or jamming signals in mobile subscriber accessing systems.

BACKGROUND OF THE INVENTION

Mobile subscriber access systems are generally well known. A typical example of such a system is shown and described in U.S. Pat. No. 4,301,530, entitled, "Orthogonal Spread Spectrum Time Division Multiple Accessing Mobile Subscriber Access System", which issued to Frank S. Gutleber, the present inventor, on Nov. 17, 1981. As shown and described in this patent, multiple subscribers or users communicate with one another through a central node or repeater during an assigned time slot or channel. In this way the synchronous time reference for all the subscribers is maintained. Furthermore, spread spectrum noise codes are employed to eliminate interference between subscribers.

SUMMARY OF THE INVENTION

Accordingly, it is an object of the present invention to provide an improvement in mobile subscriber access communications systems.

Another object of the invention is to eliminate the effect of intentional interference or jamming in mobile subscriber access communications systems.

Still another object of the invention is to eliminate intentional interference or jamming in tactical mobile subscriber communications systems.

And yet another object of the invention is to provide a mobile subscriber multiple access communications system which is adapted to remain operational in a relatively high electronic warfare interference environment.

Accordingly, these and other objects are achieved in accordance with a mobile subscriber access system utilized, for example, in military applications and including a plurality of users or subscribers wherein each subscriber utilizes a radio communications terminal and communicates with one another through a central node or repeater station. In order to eliminate undesired signals including intentional interference or jamming signals which are generated in the vicinity of the subscriber terminals and directly received thereby along with desired signals from other subscriber terminals of the system, signal interceptor means are located to receive the undesired signals, particularly jamming signals, and transmit them to the repeater station where they are relayed back to the subscriber terminals with the desired signals on an orthogonal multiplexed channel. Each subscriber terminal includes a demultiplexer which retrieves the orthogonal channel containing the undesired signals sent from the interceptor means. Additionally, means are included for adjusting the amplitude and time position of the relayed undesired signals so that they are equal to and time coincident with the directly received undesired signals. Both undesired signals are applied to signal differencing means where they cancel one another, leaving an output signal comprised of the desired signal free of the undesired interference.

DETAILED DESCRIPTION OF THE PREFERRED EMBODIMENT

Figure 1:
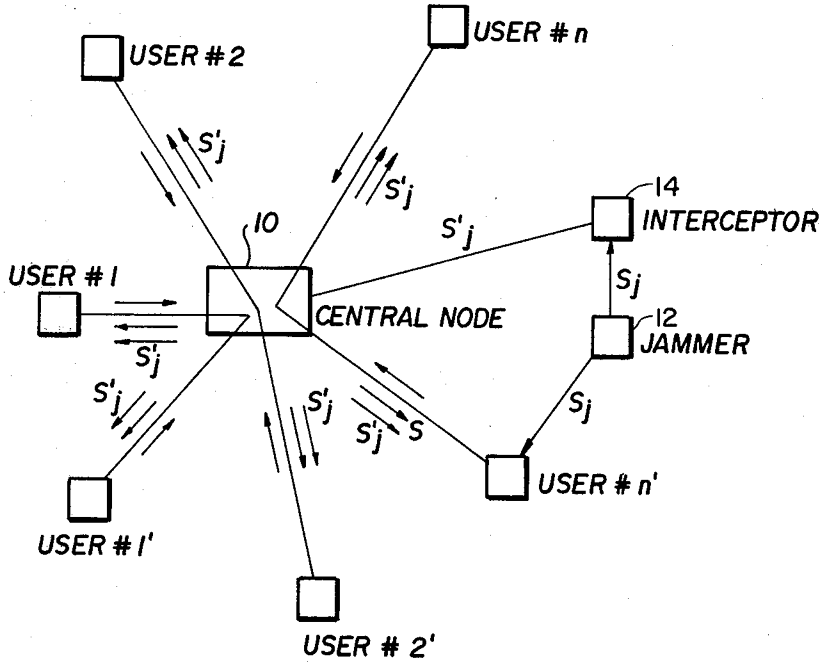
FIG. 1 is a simplified illustration of a mobile subscriber access system in accordance with the subject invention.

Referring now to the drawings and more particularly to FIG. 1, there is disclosed a mobile subscriber access system particularly adapted for military use wherein a plurality of users 1 through n' having respective mobile subscriber communications terminals communicate with one another through a central node or repeater station 10 wherein time synchronism between all of the terminal users in the system is provided by a loopback synchronous timing scheme so that pulse coded signals, for example, being communicated between the users arrive at the common node 10 at the same time in order to obtain a common time reference for all the terminals accessing the system. Although not essential for system operation, all transmissions from the various terminals to the central station 10, when desirable, can be made in one frequency band $F_1$ and those from the central station to the terminals can be made in a different frequency band $F_2$. This makes the various terminals receptive to transmissions from the central node 10 rather than the specific transmissions from another like terminal in close proximity and thus provides a space-time reference for all the users 1 through n' with the various accessing signals being synchronously locked to a common time reference.

In the event that a source 12 of undesired signals including intentional interference or jamming signals, is placed in the vicinity of the mobile subscriber access system shown in FIG. 1, and transmit, for example, a jamming signal $S_j$ in the operational frequency band of the system, the present invention contemplates placing a jamming signal interceptor 14 in a position where it is adapted to intercept the jamming signal $S_j$ and transmit this signal as signal $S'_j$ to the central station 10 on an orthogonal signal channel which may be frequency or time division multiplexed with the channels used in the mobile subscriber system or it may utilize orthogonal antenna polarization, depending upon the specific implementation desired. The central node or station 10 then relays the jamming signal $S'_j$ to all of the mobile subscriber terminals of users 1 through n' on a dedicated signal channel which is orthogonally multiplexed with the respective signal channels assigned for communicating desired signals S to the various subscriber terminals including a user being jammed, which, for example, as shown in FIG. 1, comprises the user n'.

Figure 2:
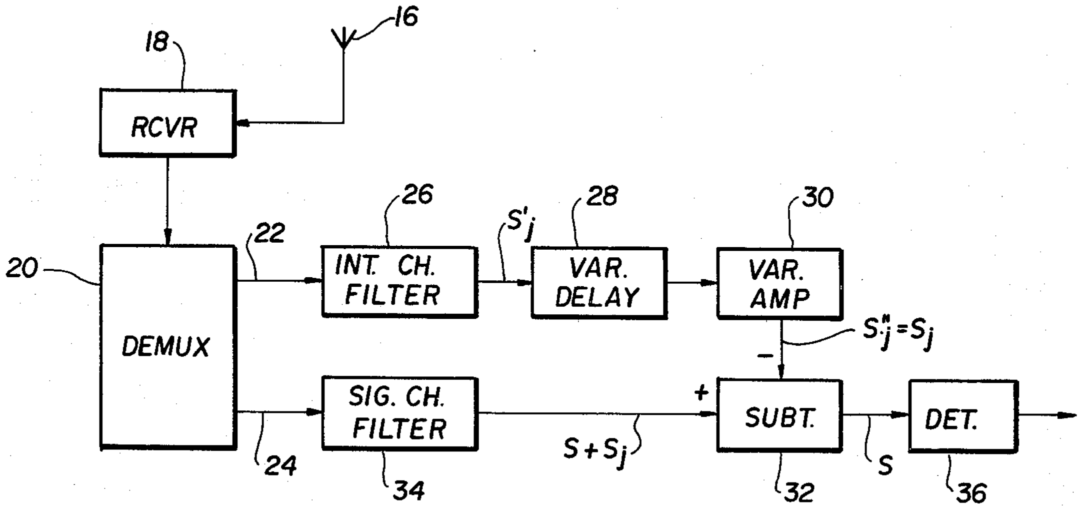
FIG. 2 is a functional block diagram illustrative of a mobile subscriber receiver terminal utilized in the system shown in FIG. 1.

Referring now to FIG. 2, each mobile subscriber terminals of the users 1 through n' includes receiver apparatus including, among other things, a receiving antenna 16, an RF front end section 18, and a demultiplexer 20 which demultiplexes the orthogonal channel containing the relayed jamming signal $S'_j$ and the channel containing a desired signal S plus the jamming signal $S_j$ transmitted directly to the antenna 16 from the jamming source 12 as shown in FIG. 1. The orthogonal channel is shown in FIG. 2 by reference numeral 22, while the desired signal channel is shown by reference numeral 24. The relayed jamming signal $S'_j$ is coupled to a signal filter 26, a variable time delay circuit 28, and a variable amplifier 30, also included in the receiver apparatus, which is respectively adapted to adjust the time position and amplitude of the relayed interference signal $S'_j$ so that it equals the directly transmitted jamming signal $S_j$ and is coincident in time therewith. The adjusted jamming signal is shown in FIG. 2 as the output signal $S''_j$ and is applied to one, i.e. the negative (−) input of signal differencing means shown comprising a signal subtractor 32. The signal subtractor 32 has its other, i.e. positive (+) input coupled to the desired signal S plus the directly transmitted jamming signal $S_j$ which has been filtered by a filter 34 coupled to the signal channel 24. Since the two jamming signals $S''_j$ and $S_j$ are equal in amplitude and are coincident in time, the signal subtractor 32 operates to cancel the undesired jamming signal $S_j$ while providing an output signal comprising an interference free desired signal S which is then coupled to suitable detector circuitry 36.

What is significant about the interference cancelling system as shown and described is that it requires no adaptive nulling antenna or coded spread spectrum signals as disclosed in the aforementioned U.S. Pat. No. 4,301,530 to achieve a significant improvement in the signal to jamming (S/J) ratio.

Having thus shown and described what is at present considered to be the preferred embodiment of the invention, all modifications, alterations and changes coming within the spirit and scope of the invention as set forth in the appended claims are herein meant to be included.

I claim:

1. A method of eliminating undesired signals including intentional interference or jamming signals in a mobile subscriber access communications system wherein a plurality of mobile subscriber communication terminals selectively respectively transmit and receive desired signals from one another via a central station which receives and retransmits the desired signals to said terminals in respective signal channels and wherein said terminals additionally receive said undesired signals directly from an interfering signal source in said signal channels, comprising the steps of:

intercepting said undesired signals;

transmitting the intercepted undesired signals to said central station;

relaying the intercepted undesired signals from said central station to said terminals in a separate channel relative to the respective signal channels;

receiving and respectively providing the relayed undesired signal contained in said separate channel and the desired signal plus the directly transmitted undesired signal contained in the signal channel;

adjusting the amplitude and time position of the relayed undesired signal so that it is equal to and coincident in time with the directly transmitted undesired signal; and differencing the adjusted and directly transmitted undesired signals whereby they cancel one another leaving the desired signal free of said undesired signal.

2. The method as defined by claim 1 wherein said relaying step includes orthogonally multiplexing the signals in the separate channel and the signal channel, and wherein said step of receiving and providing includes the step of demultiplexing the signals in said dedicated channel and said signal channel.

3. The method as defined by claim 1 wherein said step of transmitting the intercepted undesired signal to said central station includes a step of orthogonally transmitting the intercepted undesired signal to said central station.

4. The method as defined by claim 3 wherein said step of orthogonally transmitting comprises transmitting the undesired signal to the central station by frequency multiplexing the undesired signal on an orthogonal channel relative to the respective signal channels.

5. The method as defined by claim 3 wherein said step of orthogonally transmitting comprises transmitting the undesired signal to the central station by time division multiplexing the undesired signal on an orthogonal channel relative to the respective signal channels.

6. The method as defined by claim 3 wherein said step of orthogonally transmitting comprises transmitting the undesired signal to the central station by orthogonal antenna polarization transmission.

7. A system for eliminating undesired signals including intentional interference or jamming signals in a mobile subscriber access communications system comprising:

a central node or repeater station and a plurality of mobile subscriber communication user terminals selectively transmitting and receiving desired signals from one another via said central station which operates to receive and retransmit the desired signals to said terminals in respective desired signal channels;

at least one of said terminals directly receiving, in its respective desired signal channel, an undesired signal from an undesired signal source;

means in the vicinity of said mobile subscriber access system for intercepting said undesired signal from said source, said intercepting means including means for transmitting the intercepted undesired signal to said central station;

said central station including means for relaying the undesired signal from said interceptor means to said terminals in a separate channel relative to the respective desired signal channel;

said terminals respectively including means for receiving and separately providing the relayed undesired signal contained in said separate channel and the desired signal plus the directly transmitted undesired signal contained in the desired signal channel, means for adjusting the amplitude and means for adjusting the time position of the relayed undesired signal in said separate channel so that it is equal to and coincident in time with the directly transmitted undesired signal in said signal channel, and signal differencing means coupled to the adjusted relayed undesired signal and the directly transmitted undesired signal and operating to cancel the undesired signals while providing an interference free output of the desired signals.

8. The system as defined by claim 7 wherein said central station additionally includes means for multiplexing the relayed undesired signal in said separate channel and the desired signals in said desired signal channels.

9. The system as defined by claim 8 wherein said means for multiplexing comprises means for orthogonally multiplexing the relayed undesired signal and the desired signals.

10. The system as defined by claim 8 and wherein said means in said terminals for separately providing the relayed undesired signal and the desired signal plus the directly transmitted undesired signal includes demultiplexer means.

11. The system as defined by claim 7 wherein said means for adjusting the amplitude of the relayed undesired signal comprises variable gain signal amplifier means.

12. The system as defined by claim 7 wherein said means for adjusting the time position of the relayed undesired signal comprises variable time delay means.

13. The system as defined by claim 7 wherein said signal differencing means comprises signal subtractor means having a pair of inputs of mutually opposite signal polarity and wherein the adjusted relayed undesired signal is applied to one of said inputs and the desired signal plus the directly transmitted undesired signal is applied to the other of said inputs.

14. The system as defined by claim 7 and additionally including respective channel signal filter means in said receiving means for separately filtering the relayed undesired signal and the desired signal plus the directly transmitted undesired signal.

* * * * *